Jan. 17, 1950 A. J. MUMMERT 2,494,896
PISTON EXPANDER

Filed Dec. 20, 1946 2 Sheets-Sheet 1

INVENTOR:
ARDEN J. MUMMERT
BY
ATTORNEYS.

Jan. 17, 1950  A. J. MUMMERT  2,494,896
PISTON EXPANDER

Filed Dec. 20, 1946  2 Sheets-Sheet 2

INVENTOR:
ARDEN J. MUMMERT

BY Bruninga and Sutherland
ATTORNEYS.

Patented Jan. 17, 1950

2,494,896

UNITED STATES PATENT OFFICE 2,494,896

PISTON EXPANDER

Arden J. Mummert, University City, Mo., assignor to McQuay-Norris Manufacturing Company, St. Louis, Mo., a corporation of Delaware Application December 20, 1946, Serial No. 717,495

9 Claims. (Cl. 309—12)

This invention relates generally to piston expanders of the character employed in internal combustion engines.

When the cylinders and/or pistons of an internal combustion engine become worn to the extent such that the pistons slap, it is common to provide the piston with an expander which, in the case of pistons which have slit and flexible skirts, functions to resiliently enlarge the circumference of the piston skirt and reduce the operating clearance between the piston and its cylinder.

Such expanders have been provided in a great variety of forms. For the most part, they involve springs of the cantilever type, either formed of flat stock or rods, which contact the piston skirt at relatively few lines. Any such cantilever type spring is subject to severe vibration at certain frequencies. The piston is likewise subject to vibration and if, as frequently happens, there is a critical frequency at which both members vibrate in tune, breakage of one or both is liable to occur during operation, and, short of breakage, optimum performance is not obtained.

The object of the present invention, generally stated, is to provide a piston expander which will dampen vibration of the piston skirt.

Another object of the invention is to provide a piston expander which will not have the disadvantageous vibration characteristics of those heretofore provided.

Other objects will become apparent to those skilled in the art when the following description is read in connection with the accompanying drawings, in which.

Figures 7, 8, 9, 10, 11, and 12 are, respectively, perspective views of different forms of circumferentially or lengthwise compressible springs usable in lieu of the coil springs shown in Figures 1 to 5, inclusive.

In accordance with the present invention, a piston having a slit and flexible skirt is provided with a circumferentially resilient expander, such as a coil spring or its equivalent, which, when installed in a piston, is under circumferential compression as distinguished from the radial compression which characterizes a C-type ring. Such a circumferentially resilient expander is arranged to engage the inner periphery of the piston skirt at a great multiplicity of lines, with the expander under compression, so that inherent tendency to expand extends in a circumferential direction about the skirt. Such an expander may be either continuous or discontinuous; if discontinuous, its ends may abut each other so as to have the effect of a continuous spring; or the ends may seat against internal abutments on the piston skirt. In any event, the length of the expander, when free and unconfined, is substantially in excess of the length thereof when installed in the piston.

Figure 1:
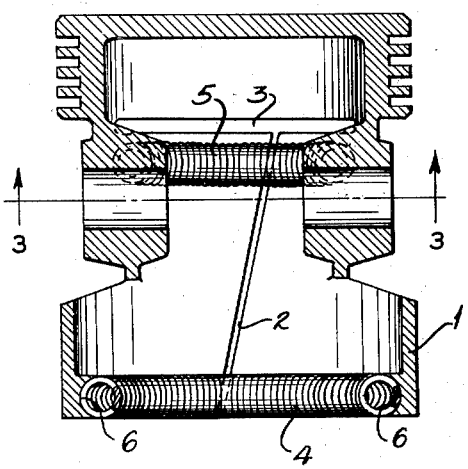
Figure 1 is an axial sectional view of a slit skirt piston provided with an expander constructed in accordance with the present invention.
Figure 3:
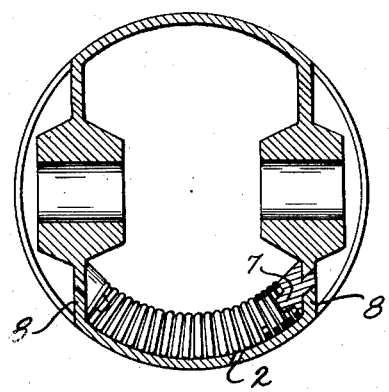
Figure 3 is a sectional view taken along line 3—3 of Figure 1.
Figure 2:
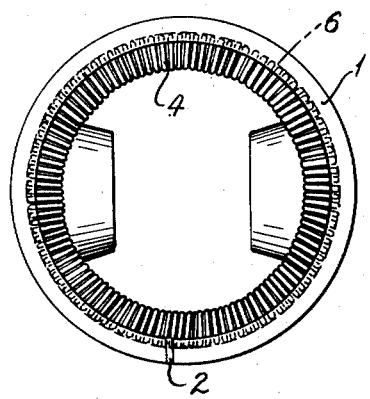
Figure 2 is a bottom end view of the piston expander assembly shown in Figure 1.

Referring now to Figures 1, 2, and 3 of the drawings, a piston having a skirt 1 provided with a longitudinal slit 2 and a circumferential slot 3 in a manner well known to those skilled in the art is equipped with a coil spring expander 4 at the bottom of the skirt and another such coil spring expander 5 adjacent the top of the skirt.

In the embodiment shown, the coil spring 4 is continuous, it being understood, as aforesaid, that, when the spring 4 is free and unconfined, its circumference is somewhat greater than when in the installed position shown. In other words, the spring 4 is so wound that the individual coils thereof inherently tend to spread apart from the position shown in the drawings.

In order to secure the spring 4 in position within the piston, the piston skirt 1, adjacent its open end, is provided with an internally concave groove 6 having a radius corresponding substantially to the external radius of the individual coils constituting spring 4. In other words, the groove 6 and the spring 4 are preferably coaxial, so that the inherent tendency of the spring 4 to increase its circumference holds it seated in the groove 6. While, in the embodiment shown, the groove 6 is continuous about the open end of the piston, it will be understood that a discontinuous groove will suffice to hold the spring 4 in position. Where such a groove as 6 is provided for retaining the spring, the spring 4 is preferably not at its minimum length when in operating position, as otherwise it is more difficult to install.

At the upper end of the piston skirt 1, the coil spring 5 extends across slit 2 with its ends seated respectively upon lugs 7 appropriately secured to the webs 8 of the piston. In this instance, as before, the length of the spring 5, when free and unconfined, is substantially in excess of the circumferential distance between the lugs 7 or, in other words, substantially more than the length of the spring 5 in the position shown. The spring may, however, be compressed sufficiently below the length shown in the drawing to permit its insertion into the position shown. When thus installed with the lugs 7 secured to the webs 8, it will be apparent that the tendency of the spring 5 to resume its normal length has the effect of spreading the slit 2 and thus increasing the circumference of the skirt.

Figure 4:
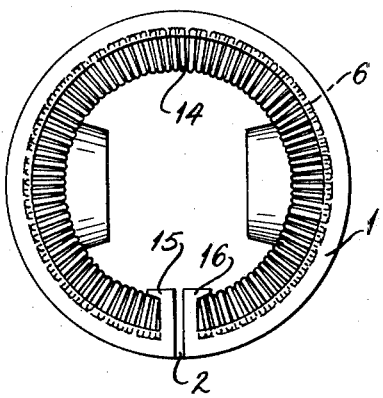
Figure 4 is a view corresponding to Figure 3, but showing a further embodiment of the invention.

In the embodiment shown in Figure 4, a discontinuous coil spring 14, which, when free and unconfined, has a straight axis, is installed with its opposite ends seated against abutment pads 15 and 16 integral with the skirt of the piston adjacent slit 2. As in the case of the previous embodiments, the coil spring 14, when free and unconfined, is of a length somewhat in excess of the circumferential distance from pad 15 clockwise to pad 16. Since the spring 14 extends completely about the internal periphery of the skirt from adjacent the opposite sides of slit 2, its tendency when under compression is to elongate and thus increase the circumference of the skirt by further separation at slit 2.

Figure 5:
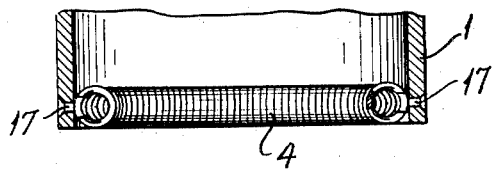
Figure 5 is a view corresponding to the lower end of Figure 1 and showing an alternative mode of securing the expander within the piston.
Figure 6:
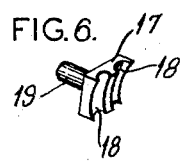
Figure 6 is a perspective view of the securing device utilized in Figure 5.

In lieu of providing the concave groove 6 for securing the springs 4 or 14 in position adjacent the open end of the skirt, one or more coil-engaging rivets 17, shown in detail in Figure 6, may be provided. The member 17 has a head grooved at 18 to embrace two adjacent coils of the expander and therebetween is provided with a shank 19 to extend through the skirt 1 of the piston and be peened over on the exterior, as shown in Figure 5.

Figure 7:
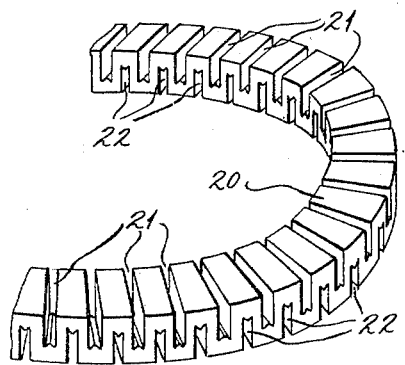

As an alternative to the coil springs shown in the previous embodiments, circumferentially or lengthwise compressible members formed of solid stock and appropriately slotted may be utilized. For example, as shown in Figure 7, a bar or ring 20 is provided with spaced slots 21 extending from the upper radial face thereof downwardly toward the lower radial face. Between the respective slots 21, similar slots 22 extend upwardly from the lower radial face toward the upper radial face. The slots 21 and 22 overlap each other at their inner extremities, thus producing an article which is compressible so as to reduce its circumferential length.

Figure 8:
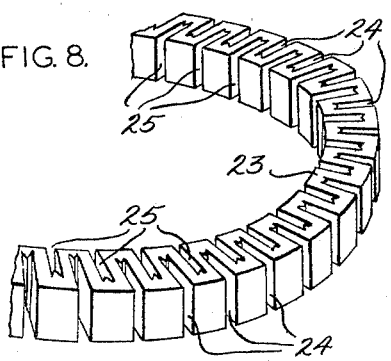

In the embodiment shown in Figure 8, a bar of metallic stock 23 is provided with slots 24, extending inwardly from the exterior face, and correspondingly arranged slots 25, extending outwardly from the inner peripheral face, said slots 24 and 25 overlapping at their inner extremities, thus producing an article which is resiliently compressible so as to reduce its circumferential length.

Figure 9:
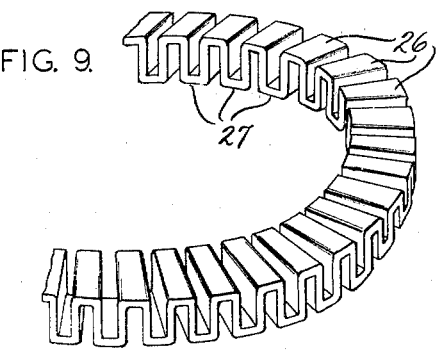

In Figure 9, a strip of spring stock, such as steel, is bent to form alternate upwardly extending humps 26 and downwardly extending humps 27. The humps may be formed square, as shown, rounded, or of any other desirable shape, but the general sinuous form of the strip produces an article which is resiliently compressible to reduce its circumferential length.

Figure 10:
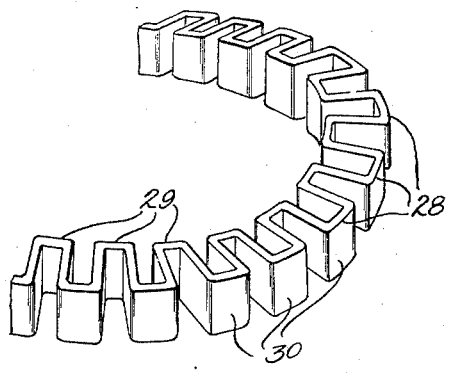

In Figure 10, a similar strip of stock is bent in a manner corresponding to that shown in Figure 9, but so that the edges of the stock constitute the upper and lower radial faces. In this embodiment, outwardly extending humps 28 are intervened by inwardly extending humps 29, it being understood that the faces 30 engage the inner periphery of the piston skirt.

Figure 11:
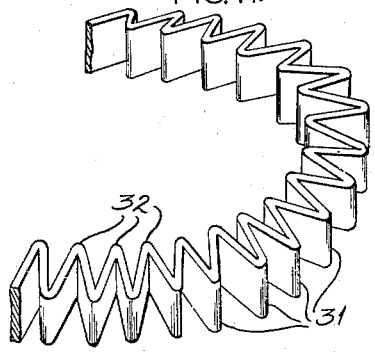
Figure 12:
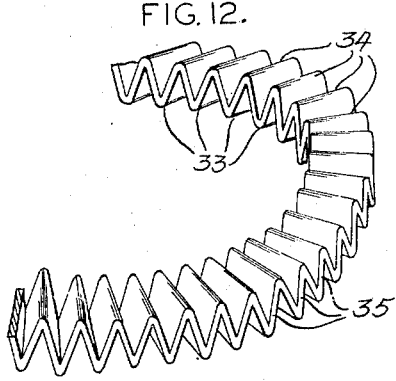

Whereas, in Figure 10, a strip of stock is bent so that the legs of the humps are substantially parallel to each other or parallel to the radii on which the member is bent, in the embodiment shown in Figure 11, a strip of spring stock is folded to produce fold lines 31 at the exterior periphery, intervened by fold lines 32 at the interior periphery, to produce a member which is likewise circumferentially compressible. In this embodiment, the exterior fold lines 31 engage the interior periphery of the piston skirt. In Figure 12, a similar strip of spring stock is similarly folded to produce lower fold lines 33 intervened by fold lines 34 at the upper side. In this embodiment, the edges 35 of the folds engage the inner periphery of the piston skirt and the member is circumferentially compressible, as previously described.

The circumferentially compressible members shown in Figures 7 to 12, inclusive, may be applied to the piston in any desired manner, such, for example, as the arrangements shown for the coil springs 4 and 14 in Figures 1 to 5, inclusive. The circumferentially compressible members of Figures 7 to 12, inclusive, may be formed straight or curved and may be installed with their ends abutting internal projections on the piston or with their ends abutting each other. If desired, the ends of the members may be welded or otherwise connected together so as to produce a continuous circumferentially compressible ring.

It will be understood that the springs utilized in accordance with the present invention are in all instances, when free and unconfined, of a peripheral length greater than when installed in operating position within the piston. When installed, the spring is under compression, with a tendency to expand lengthwise in the circumferential direction about the skirt, and the spring preferably extends across the diameter on which slit 2 is located. In the case of the embodiment shown in Figure 4, the diameter through the slit 2 is crossed only on the opposite side of the piston from the slit. When the spring crosses said diameter, on either the slit or unslit side, the slit is spread and the skirt distorted in a more desirable manner than when the spring is located entirely on one side of said diameter.

Springs of the character herein referred to, being in engagement with the skirt at a great multipilicity of lines and having vibrating characteristics in complete contrast to the vibrating characteristics of the skirt, tend to dampen vibrations in the skirt, and at the same time the skirt tends to dampen vibration of the spring.

From the foregoing description, those skilled in the art should readily understand the construction and operation of the invention. While several embodiments have been disclosed in several positions within the piston, it is not to be understood that the invention is limited to the details shown. For example, the spring expanders may be utilized in the intermediate position on the piston skirt or may be utilized at the top of the skirt or at the bottom of the skirt, either alone or in conjunction with others. Many modifications and variations will, it is realized, present themselves to those skilled in the art without departing from the spirit of the invention or the scope of the appended claims.

Having thus described the invention, what is claimed and desired to be secured by Letters Patent is:

1. An expander for use with an internal combustion engine piston having a slit skirt which is subject to vibration, comprising a lengthwise compressible spring having a length when free and unconfined substantially in excess of, but being compressible to a length approximating, the internal periphery of the piston skirt, said spring having a multiplicity of turns yieldable relative to each other to vary the space between adjacent turns, and said spring being adapted to engage the internal periphery of the piston at each turn.

2. An expander for use with an internal combustion engine piston having a slit skirt which is subject to vibration, comprising an endless lengthwise compressible spring having an external length when free and unconfined substantially in excess of, but being compressible to a length approximating, the internal circumference of the piston skirt, said spring having a multiplicity of turns yieldable relative to each other to vary the space between adjacent turns, and said spring being adapted to engage the internal periphery of the piston at each turn.

3. An expander for use with an internal combustion engine piston having a slit skirt which is subject to vibration, comprising a lengthwise compressible spring, the compressibility of said spring being uniformly distributed from end to end, and means for restraining said spring against displacement from circumferential engagement with the interior periphery of said skirt while the spring is compressed lengthwise, said spring having a multiplicity of turns yieldable relative to each other to vary the space between adjacent turns, and said spring being adapted to engage the internal periphery of the piston at each turn.

4. An expander for use with an internal combustion engine piston having a slit skirt which is subject to vibration and abutments within the skirt on opposite sides of the slit, comprising a lengthwise compressible spring having, when free, a length exceeding the circumferential distance between the abutments on the piston, said spring being compressible to the extent that it may be inserted circumferentially between said abutments, said spring having a multiplicity of turns yieldable relative to each other to vary the space between adjacent turns, and said spring being adapted to engage the internal periphery of the piston at each turn.

5. The combination with an internal combustion engine piston having a slit skirt which is subject to vibration and a concave recess extending circumferentially within the skirt, of a compressed coil spring seated in said recess with its coil substantially concentric with said recess, said spring extending for a substantial circumferential distance about the interior of the piston skirt and crossing the diameter on which the piston skirt is slit, said spring having a multiplicity of turns yieldable relative to each other to vary the space between adjacent turns, and said spring being adapted to engage the internal periphery of the piston at each turn.

6. The combination with a piston for an internal combustion engine, said piston having a slit metallic skirt which is subject to vibration, of a lengthwise compressible spring having a multiplicity of turns yieldable relative to each other to vary the space between adjacent turns, said spring being disposed in compressed condition on the interior of the piston skirt with the respective turns of the spring engaging the internal periphery of the piston at a multiplicity of closely spaced points.

7. The expander of claim 3 wherein the spring is a coil.

8. The expander of claim 3 wherein the spring is a bar of spring material slitted alternately from opposite sides in spaced overlapping relation, the residual material about the slits constituting the turns.

9. The expander of claim 3 wherein the spring is a strip of spring material folded alternately throughout its length with the folds normally spread apart, the respective folds constituting the turns.

ARDEN J. MUMMERT.

REFERENCES CITED

The following references are of record in the file of this patent:

UNITED STATES PATENTS

| Number | Name | Date |
| --- | --- | --- |
| 1,410,517 | Saxton | Mar. 21, 1922 |
| 1,746,515 | Blough | Feb. 11, 1930 |
| 1,767,711 | Solenberger | June 24, 1930 |
| 1,956,454 | Orser | Apr. 24, 1934 |
| 2,256,564 | Mantle | Sept. 23, 1941 |
| 2,448,932 | Thomas | Sept. 7, 1948 |

FOREIGN PATENTS

| Number | Country | Date |
| --- | --- | --- |
| 107,138 | Austria | Mar. 15, 1927 |
| 794,121 | France | Dec. 2, 1935 |